(12) United States Patent
Kim et al.

(10) Patent No.: US 10,037,610 B1
(45) Date of Patent: Jul. 31, 2018

(54) METHOD FOR TRACKING AND SEGMENTING A TARGET OBJECT IN AN IMAGE USING MARKOV CHAIN, AND DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-Do (KR)

( * ) Notice: Subject to any disclaimer, the term of this patent is extended or adjusted under 35 U.S.C. 154(b) by 0 days.

(21) Appl. No.: 15/724,215

(22) Filed: Oct. 3, 2017

(51) Int. Cl.
*G06K 9/00* (2006.01)
*G06T 7/246* (2017.01)
*G06T 7/11* (2017.01)
*G06T 7/13* (2017.01)
*G06T 7/136* (2017.01)
(Continued)

(52) U.S. Cl.
CPC ............... *G06T 7/246* (2017.01); *G06T 7/11* (2017.01); *G06T 7/12* (2017.01); *G06T 7/13* (2017.01); *G06T 7/136* (2017.01); *G06T 7/143* (2017.01); *G06T 7/162* (2017.01); *G06T 2207/10016* (2013.01); *G06T 2207/20072* (2013.01); *G06T 2207/20076* (2013.01); *G06T 2207/20084* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2016/0004909 A1* | 1/2016 | Mei | G06K 9/3241 382/103 |
| 2016/0071287 A1* | 3/2016 | Lucey | G06T 7/2046 382/103 |

(Continued)

*Primary Examiner* — Nancy Bitar
(74) *Attorney, Agent, or Firm* — Husch Blackwell LLP

(57) ABSTRACT

A method for tracking a target object in frames of video data using Absorbing Markov Chain (AMC), including steps of: (a) acquiring a bounding box containing the target object in a current frame and a segmentation result for the target object in a previous frame; (b) obtaining obtain a region of interest (ROI) in the current frame by enlarging the bounding box to contain a portion of background information surrounding the target object; (c) acquiring information on local regions within the ROI in the current frame; (d) constructing an AMC graph using at least part of the local regions within the region of interest (ROI) in the current frame and local regions within a region of interest (ROI) in the previous frame; and (e) acquiring a segmentation result for the target object within the current frame by thresholding individual nodes in the AMC graph using absorption times thereof.

30 Claims, 17 Drawing Sheets
(10 of 17 Drawing Sheet(s) Filed in Color)

(51) Int. Cl.
*G06T 7/143* (2017.01)
*G06T 7/12* (2017.01)
*G06T 7/162* (2017.01)

(56) References Cited

U.S. PATENT DOCUMENTS

2016/0321830 A1* 11/2016 Cvetkovic ............... G06T 11/60
2017/0358090 A1* 12/2017 Li ........................... G06T 7/143

* cited by examiner

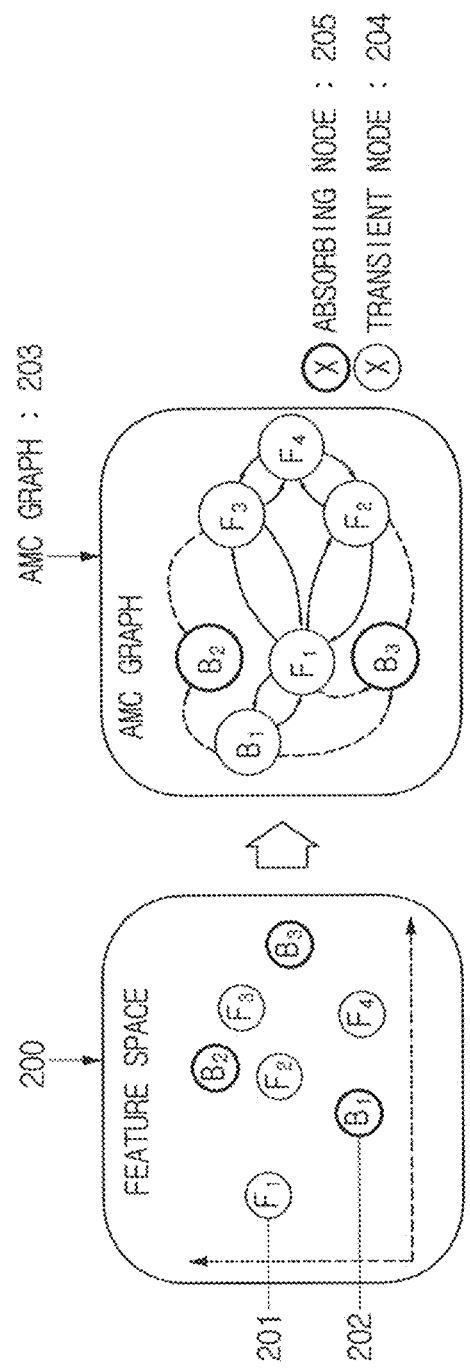

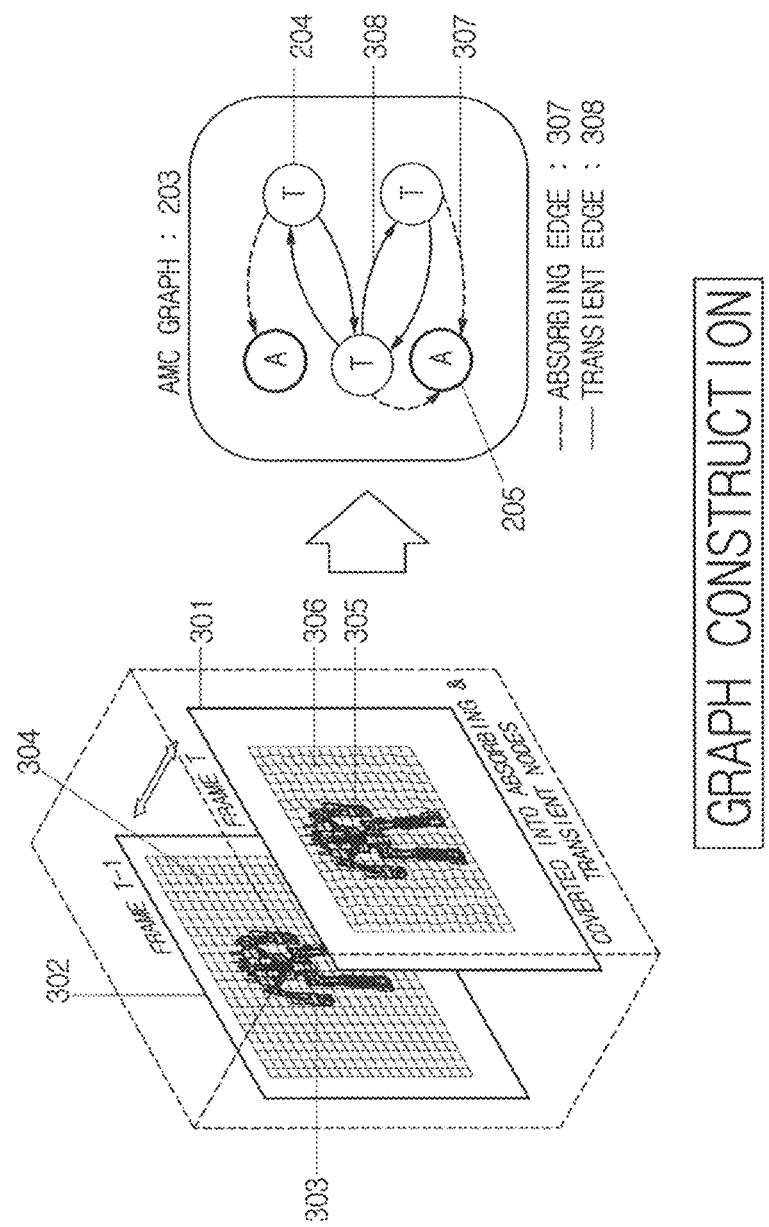

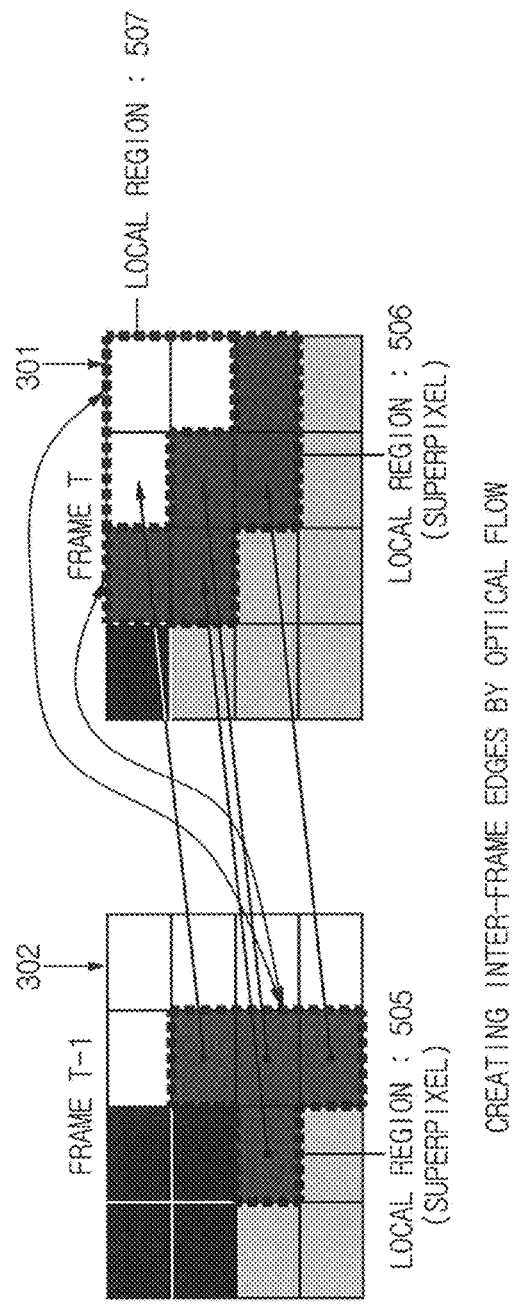

FIG. 9
(A) INPUT IMAGE
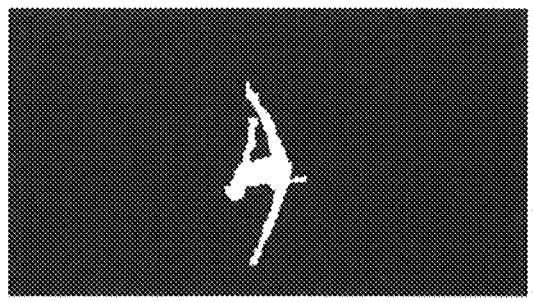
(B) GROUND-TRUTH
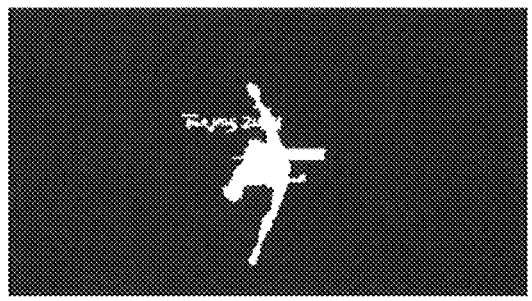
(C) $\pi t = 1$ AND $\pi a = 1$
(D) $\pi t = 1$ AND $\pi a = 5$
$\pi t$: COEFFICIENT FOR TRANSIENT NODE
$\pi a$: COEFFICIENT FOR ABSORBING NODE FIG. 10
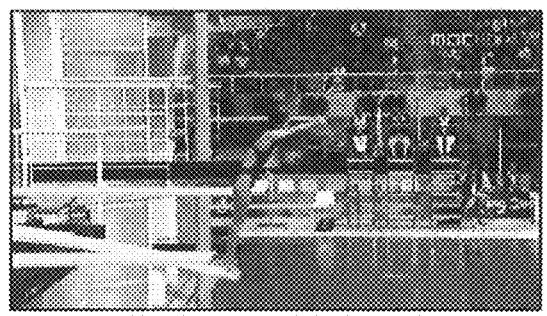
(A) INPUT IMAGE
(B) GROUND-TRUTH
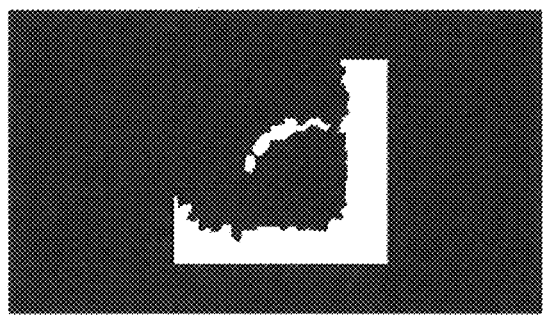
(C) SEGMENTATION RESULT WITH
ORIGINAL ABSORPTION TIME
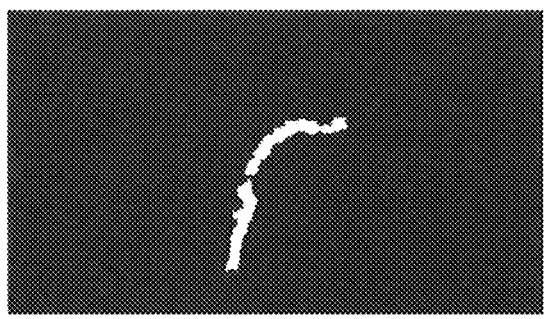
(D) SEGMENTATION RESULT WITH
MODIFIED ABSORPTION TIME FIG. 11
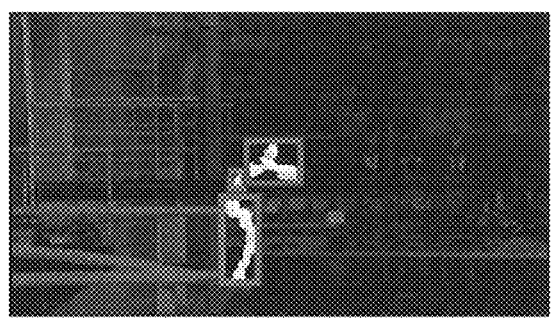
(A) 1-HOP MERGE RESULT
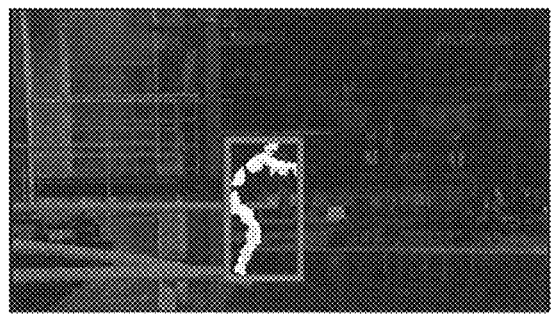
(B) 2-HOP MERGE RESULT FIG. 12
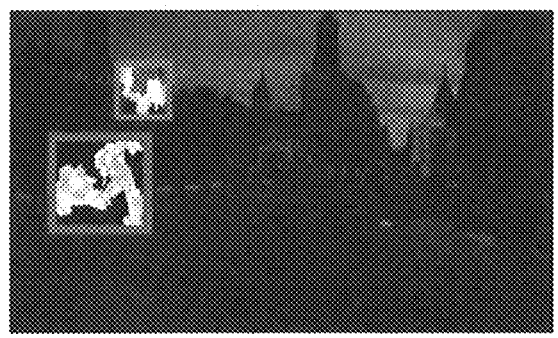
(A) TRUE TARGET (RED)
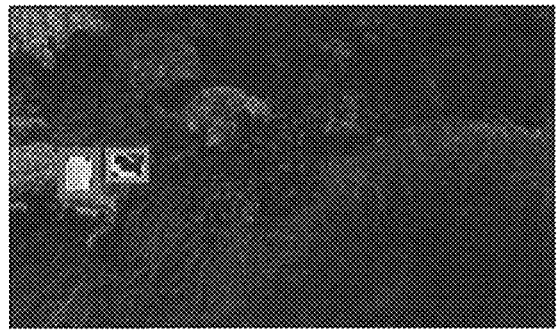
(B) TRUE TARGET (RED)

METHOD FOR TRACKING AND SEGMENTING A TARGET OBJECT IN AN IMAGE USING MARKOV CHAIN, AND DEVICE USING THE SAME

FIELD OF THE INVENTION

The present invention relates to a method, and a device for tracking a target object in frames of video data using Absorbing Markov Chain (AMC), and more particularly, to the method and the device for performing processes of of (a) acquiring a bounding box containing the target object in a current frame and a segmentation result for the target object in a previous frame; (b) obtaining a region of interest (ROI) in the current frame by enlarging the bounding box to contain a portion of background information surrounding the target object; (c) acquiring information on local regions within the ROI in the current frame; and (d) constructing an AMC graph using at least part of the local regions within the region of interest (ROI) in the current frame and local regions within a region of interest (ROI) in the previous frame; and (e) acquiring a segmentation result for the target object within the current frame by thresholding individual nodes in the AMC graph using absorption times thereof, wherein the AMC graph includes two subsets of nodes which have (i) a set of absorbing nodes corresponding to some of the local regions containing background information within the ROI in the previous frame and (ii) a set of transient nodes corresponding to the local regions within the ROI in the current frame and some of the local regions relating to the segmentation result for the target object within the ROI in the previous frame, and wherein the AMC graph includes two subsets of edges which are a set of intra-frame edges and a set of inter-frame edges, and wherein the individual nodes have their own absorption times that are the number of steps from themselves to any absorbing node; and a method and an apparatus using the same for segmenting a target object in an image.

BACKGROUND OF THE INVENTION

A variety of algorithms for visual tracking have been devised and applied to various fields of applications. The visual tracking is a challenging task since appearances of tracking targets involve in significant variations, and high-level scene understanding is often required to handle exceptions.

Tracking by detection algorithms are one of the common approaches to deal with the challenging task, which typically depends on bounding boxes for a representation of a target object. However, the tracking by detection often suffers from drifting problem when the target object involves substantial non-rigid or articulated motions.

Recently, tracking by segmentation algorithms relying only on pixel-level information have been actively proposed. However, the proposed algorithms are not sufficient to model semantic structure of the target object and some of them even utilize external segmentation algorithms, e.g., Grabcut.

As a result, visual tracking techniques employing mid-level cues have been proposed to handle non-rigid and deformable target objects. For example, one of the visual tracking techniques uses superpixels for discriminative appearance modeling by mean-shift clustering and by incorporating particle filtering to find an optimal state for the target object. Another one of the visual tracking techniques adopts a superpixel-based constellation model to deal with non-rigid deformations of the target object.

However, both of the visual tracking techniques mentioned above may be vulnerable to find semantic relations between superpixels since both techniques categorize each superpixel into foreground or background independently. To overcome limitations of those two techniques mentioned above, a technique based on a hierarchical representation for target object appearance using multiple quantization levels such as pixel, superpixel and bounding box is proposed.

In addition, another tracking technique using dynamic multi-level appearance modeling by maintaining an adaptive clustered decision tree utilizing information obtained from the three different levels is proposed as well. But, both of them requires an external segmentation algorithm such as Grabcut.

As such, all the existing approaches, or algorithms, have such drawbacks as mentioned above.

Thus, a novel tracking by segmentation algorithm with a framework using Absorbing Markov Chain is proposed in the specification of the present invention.

Particularly, the devised algorithm using AMC is well-suited for tracking target objects with the non-rigid and articulated motions. A segmentation for the target objects as well as initial segmentation mask are obtained naturally within the devised framework.

The devised algorithm distinguishes foreground and background objects accurately based on a result of projection operations that discriminate features of the target object more efficiently than metric learning.

SUMMARY OF THE INVENTION

It is an object of the present invention to solve all the problems mentioned above.

It is another object of the present invention to provide a simple, novel and powerful tracking by segmentation algorithm and framework applying Absorbing Markov Chain (AMC) for visual tracking of non-rigid and deformable target objects It is still another object of the present invention to track and segment the target objects with a high degree of accuracy by projecting features of the target objects onto a hyperplane in an embedded space.

It is still yet another object of the present invention to achieve substantially improved performance compared to the state-of-the-art segmentation-based tracking algorithms.

In accordance with one aspect of the present invention, there is provided a method for tracking a target object in frames of video using Absorbing Markov Chain by performing processes of (a) acquiring or supporting another device to acquire a bounding box containing the target object in a current frame and a segmentation result for the target object in a previous frame; (b) obtaining or supporting another device to obtain region of interest (ROI) in the current frame by enlarging the bounding box to contain a portion of background surrounding the target object; (c) acquiring or supporting another device to acquire information on local regions within the ROI in the current frame; and (d) constructing or supporting another device to construct an AMC graph using at least part of the local regions within the region of interest (ROI) in the current frame and local regions within region of interest (ROI) in the previous frame; and (e) acquiring or supporting another device to acquire a segmentation result for the target object within the current frame by thresholding individual nodes in the AMC graph using absorption times thereof, wherein the AMC graph includes two subsets of nodes which have (i) a set of absorbing nodes corresponding to local regions relating to background within the ROI in the previous frame and (ii) a set of transient nodes corresponding to local regions within the segmentation result for the target object in the previous frame and the local regions within the ROI in the current frame, wherein the AMC graph includes two subsets of edges which are a set of intra-frame edges and a set of inter-frame edges, and wherein the individual nodes have their own absorption times that are the number of steps from themselves to any absorbing node.

In accordance with another aspect of the present invention, there is provided a method for segmenting a target object in an image using Absorbing Markov Chain (AMC) by performing processes of (a) acquiring or supporting another device to acquire a bounding box containing the target object in the image; (b) obtaining or supporting another device to obtain region of interest (ROI) in the image by enlarging the bounding box to contain a portion of background surrounding the target object; (c) acquiring or supporting another device to acquire information on local regions within the ROI in the image; (d) constructing or supporting another device to construct an AMC graph using at least part of the local regions within the ROI in the image; and (e) acquiring or supporting another device to acquire a segmentation result for the target object within the image by thresholding individual nodes in the AMC graph using absorption times thereof, wherein the AMC graph includes two subsets of nodes which have (i) a set of transient nodes corresponding to local regions overlapped with the bounding box more than a specific percentage in the image and (ii) a set of absorbing nodes corresponding to a part of local regions within the ROI in the image which are not determined as the transient nodes, and wherein each of the transient and absorbing nodes in the AMC graph has its own absorption time that is the number of steps from itself to any absorbing node.

In accordance with still another aspect of the present invention, there is provided a device for tracking a target object in frames of video data using Absorbing Markov Chain (AMC), comprising: a communication part for acquiring the video data; and a processor for performing (i) a process of acquiring or supporting another device to acquire a bounding box containing the target object in a current frame within the video data and a segmentation result for the target object in a previous frame within the video data; (ii) a process of obtaining or supporting another device to obtain region of interest (ROI) in the current frame by enlarging the bounding box to contain a portion of background surrounding the target object; (iii) a process of acquiring or supporting another device to acquire information on local regions within the ROI in the current frame; (iv) a process of constructing or supporting another device to construct an AMC graph using at least part of the local regions within the region of interest (ROI) in the current frame and local regions within region of interest (ROI) in the previous frame; and (v) a process of acquiring or supporting another device to acquire a segmentation result for the target object within the current frame by thresholding individual nodes in the AMC graph using absorption times thereof, wherein the AMC graph includes two subsets of nodes which have (i) a set of absorbing nodes corresponding to local regions relating to background within the ROI in the previous frame and (ii) a set of transient nodes corresponding to local regions within the segmentation result for the target object in the previous frame and the local regions within the ROI in the current frame, wherein the AMC graph includes two subsets of edges which are a set of intra-frame edges and a set of inter-frame edges, and wherein the individual nodes have their own absorption times that are the number of steps from themselves to any absorbing node.

In accordance with still yet another aspect of the present invention, there is provided a device for segmenting a target object in an image using Absorbing Markov Chain (AMC), comprising: a communication part for acquiring the image; and a processor for performing (i) a process of acquiring or supporting another device to acquire a bounding box containing the target object in the image; (ii) a process of obtaining or supporting another device to obtain region of interest (ROI) in the image by enlarging the bounding box to contain a portion of background surrounding the target object; (iii) a process of acquiring or supporting another device to acquire information on local regions within the ROI in the image; (iv) a process of constructing or supporting another device to construct an AMC graph using at least part of the local regions within the ROI in the image; and (v) a process of acquiring or supporting another device to acquire a segmentation result for the target object within the image by thresholding individual nodes in the AMC graph using absorption times thereof, wherein the AMC graph includes two subsets of nodes which have (i) a set of transient nodes corresponding to local regions overlapped with the bounding box more than a specific percentage in the image and (ii) a set of absorbing nodes corresponding to a part of local regions within the ROI in the image which are not determined as the transient nodes, and wherein each of the transient and absorbing nodes in the AMC graph has its own absorption time that is the number of steps from itself to any absorbing node.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above objects and technical features of the present invention will become conspicuous from the following description of preferred embodiments given in conjunction with the accompanying drawings, wherein like reference numerals refer to like parts throughout the several views, in which:

FIG. 2 is a drawing schematically illustrating a process of constructing an Absorbing Markov Chain (AMC) graph with original features obtained from superpixels.

FIG. 3 is a drawing schematically illustrating a process of constructing an Absorbing Markov Chain (AMC) graph with two consecutive frames in accordance with one example embodiment of the present invention.

FIG. 5B is a drawing illustrating a method of constructing inter-frame edges within the AMC graph in accordance with one example embodiment of the present invention.

FIG. 9 is a drawing illustrating an impact of different coefficients used by weight adjustments on segmentation results in accordance with one example embodiment of the present invention.

FIG. 10 is a drawing exemplarily illustrating a comparison of segmentation results on a basis of different absorption times in accordance with one example embodiment of the present invention.

FIG. 11 is a drawing exemplarily illustrating benefits of employing holistic appearance model in accordance with one example embodiment of the present invention.

FIG. 12 is a drawing exemplarily presenting a comparison result of merging with 1-hop and 2-hop neighborhood systems of superpixel in accordance with one example embodiment of the present invention.

DETAILED DESCRIPTION OF THE PREFERRED EMBODIMENTS

Figure 1:
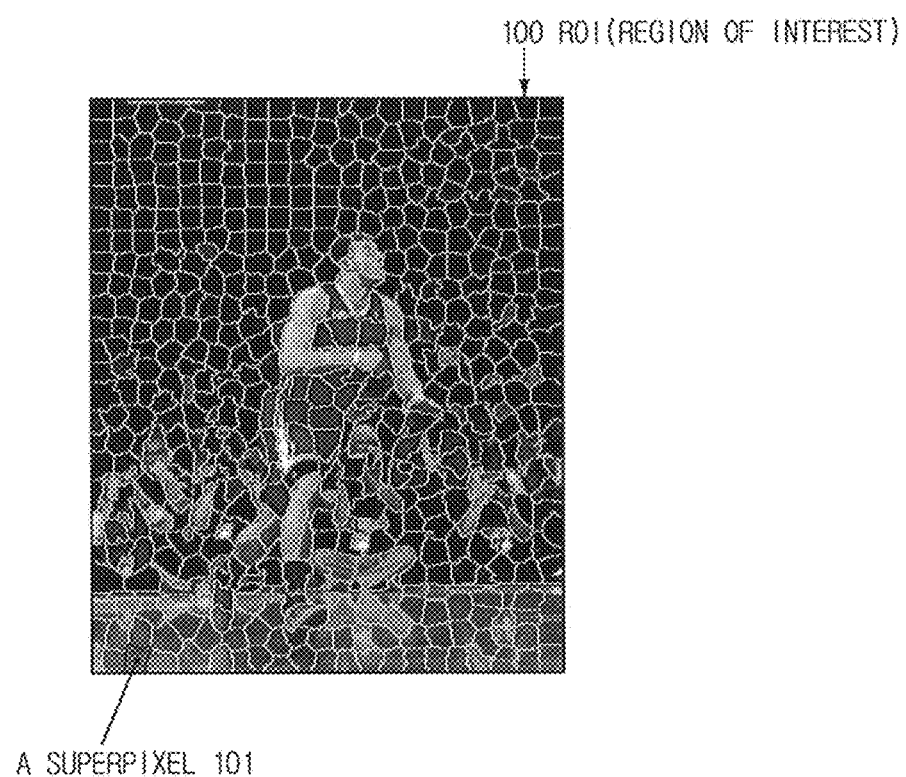
FIG. 1 is a drawing illustrating a region of interest (ROI) in a frame being segmented into a plurality of mid-level cues, e.g., superpixels, by applying a mid-level segmentation algorithm to the region of interest (ROI) in the frame.

To make purposes, technical features, and advantages of the present invention clear and conspicuous, reference is made to the accompanying drawings that show, by way of illustration, more detailed example embodiments or preferred embodiments in which the invention may be implemented. These preferred embodiments are described in sufficient detail to enable those skilled in the art to practice the present invention.

It is to be appreciated that the various embodiments of the present invention, although different, are not necessarily to be mutually exclusive. For example, a particular feature, structure, configuration, or characteristic described herein in conjunction with one example embodiment may be implemented within other embodiments without departing from the spirit and scope of the present invention. In addition, it is to be appreciated that the position or arrangement of individual elements within each disclosed embodiment may be modified or replaced without departing from the spirit and scope of the present invention. The following detailed description is, therefore, not to be taken in a limiting sense, and the scope of the present invention is defined by the appended claims, appropriately interpreted, along with the full range of equivalents to which the claims are entitled. In the drawings, like numerals indicate the same, similar, or corresponding parts and functions throughout the several views.

Tracking algorithm disclosed by the present invention aims to track target objects in video data, e.g., video sequences or video frames, within which the target objects rapidly and continuously change their sizes or motions. Terms such as "frame", "image" and "frame image" are used interchangeably in the present disclosure.

FIG. 1 is a drawing illustrating a region of interest (ROI) 100 in a frame being segmented into a plurality of mid-level cues, e.g., superpixels 101, by applying a mid-level segmentation algorithm to the region of interest (ROI) 100 in the frame.

The tracking algorithm of the present invention designates superpixels 101 as the mid-level cues, but it is not necessarily to be limited thereto. A superpixel segmentation algorithm such as SLIC is incorporated to obtain a set of superpixels 101 within the region of interest (ROI) 100 in the frame.

A set of superpixels 101 is acquired as follows: The ROI 100 in the frame is partitioned into a plurality of local regions and then pixels within the respective local regions are clustered into a superpixel. Number of the superpixels within the ROI 100 in the frame is proportional to a size of the ROI 100 in the frame. Herein, the maximum number of superpixels within each ROI in each frame is set to be 600. For a reference, the local regions are represented by the superpixels, but it is conspicuous for those skilled in the art that the local regions may not be limited thereto.

The mid-level cues like the superpixels 101 have been used for various computer vision tasks due to its effectiveness in representation. Compared with information from bounding boxes or pixels, mid-level cues, e.g., superpixels 101, may be effective in modeling both feature-level and semantic-level information of the target objects. In addition, a usage of the superpixels 101 greatly reduces the complexity of sophisticated image processing and computer vision tasks since the number of the superpixels is much more less than the number of pixels, obviously.

FIG. 2 is a drawing schematically illustrating a process of constructing an Absorbing Markov Chain (AMC) graph 203 with original features obtained from superpixels 101.

Referring to FIG. 2, B1, B2 and B3 202 denote background features while F1, F2, F3 and F4 201 denote foreground features in a feature space 200. Each of the foreground features 201 is converted into each transient node 204 in the AMC graph 203 whereas each of the background features 202 is transformed into each absorbing node 205 in the AMC graph 203.

FIG. 3 is a drawing schematically illustrating a process of constructing an Absorbing Markov Chain (AMC) graph with two consecutive frames in accordance with one example embodiment of the present invention.

Referring to FIG. 3, the tracking algorithm constructs the AMC graph 203 using all the superpixels 101 within the regions of interest (ROIs) 100 in the two consecutive frames t 301 and t−1 302 as illustrated in FIG. 3. Herein, the two consecutive frames stand for frames adjacent to each other in a time domain, but it is not necessarily limited thereto. The vertices, i.e. nodes, corresponding to background superpixels 304 in the previous frame t−1 302 are used to create the absorbing nodes 205 while foreground superpixels 303 in both frames and background superpixels 306 in the frame t 301 are mapped to the transient nodes 204 in the AMC graph 203. Notably, B1 which represents the background superpixel 306 in the frame t 301 is the case.

In addition, there are two types of edges in the AMC graph 203. A set of intra-frame edges and a set of inter-frame edges constitute the overall edges in the AMC graph 203. The tracking algorithm may create one of the intra-frame edges in the AMC graph 203 with any two adjacent superpixels in the ROI of the frame t 301 or with any two adjacent superpixels in the ROI of the frame t−1 302. Also, the tracking algorithm may create one of the inter-frame edges in the AMC graph 203 by incorporating motion information to determine temporal adjacency between superpixels in the two consecutive frames t 301 and t−1 302. As the case may be, two different frames which are not adjacent to each other may be used to create one of the inter-frame edges.

That is, the inter-frame edges are created by spatial proximity found with the motion information while the intra-frame edges connect superpixels within 2 hops based on vertex adjacency in the same frame. For a reference, a node within 1 hop means a direct neighbor while a node within 2 hops indicates a neighbor of the direct neighbor. All the edges in the AMC graph 203 are bi-directional and have symmetric edge weights except for those going into the absorbing nodes 205. Such edges are unidirectional to satisfy absorbing property of the AMC graph 203.

Figure 4A:
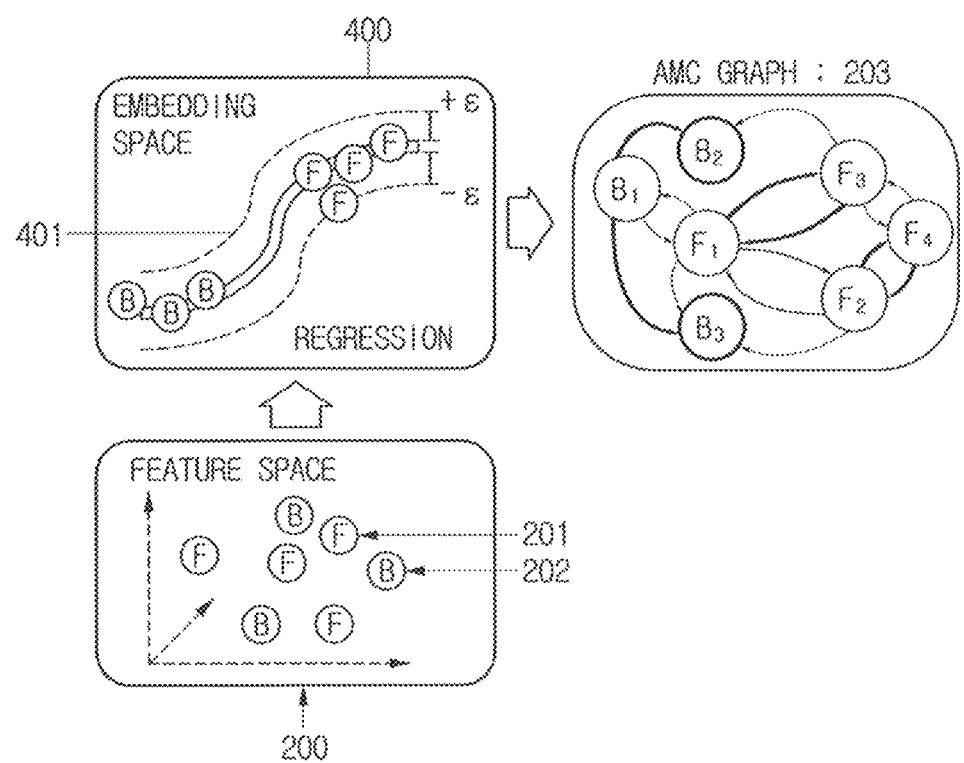
FIG. 4A is a drawing schematically illustrating a process of constructing an AMC graph with projected features in an embedding space in accordance with one example embodiment of the present invention.

FIG. 4A is a drawing schematically illustrating a process of constructing an AMC graph with projected features in an embedding space in accordance with one example embodiment of the present invention.

Referring to FIG. 4A, features of superpixels in the feature space 200 is categorized into two types, e.g., the foreground features 201 and the background features 202. Superpixels within a region related to the target objects to be tracked are designated as the foreground superpixels, or the foreground features 201, whereas superpixels other than those related to the target objects are classified as the background features, or the background superpixels 202.

As shown in FIG. 4A, projection is performed by using a regression model with at least one regressor. On a projected hyperplane 401 in the embedding space 400, features extracted from same or similar regions have a higher degree of similarity thereamong whereas features extracted from distinct regions have a lower degree of similarity thereamong. Projecting the original features of superpixels may result in improving accuracy of segmentation results, i.e., tracking results.

Figure 4B:
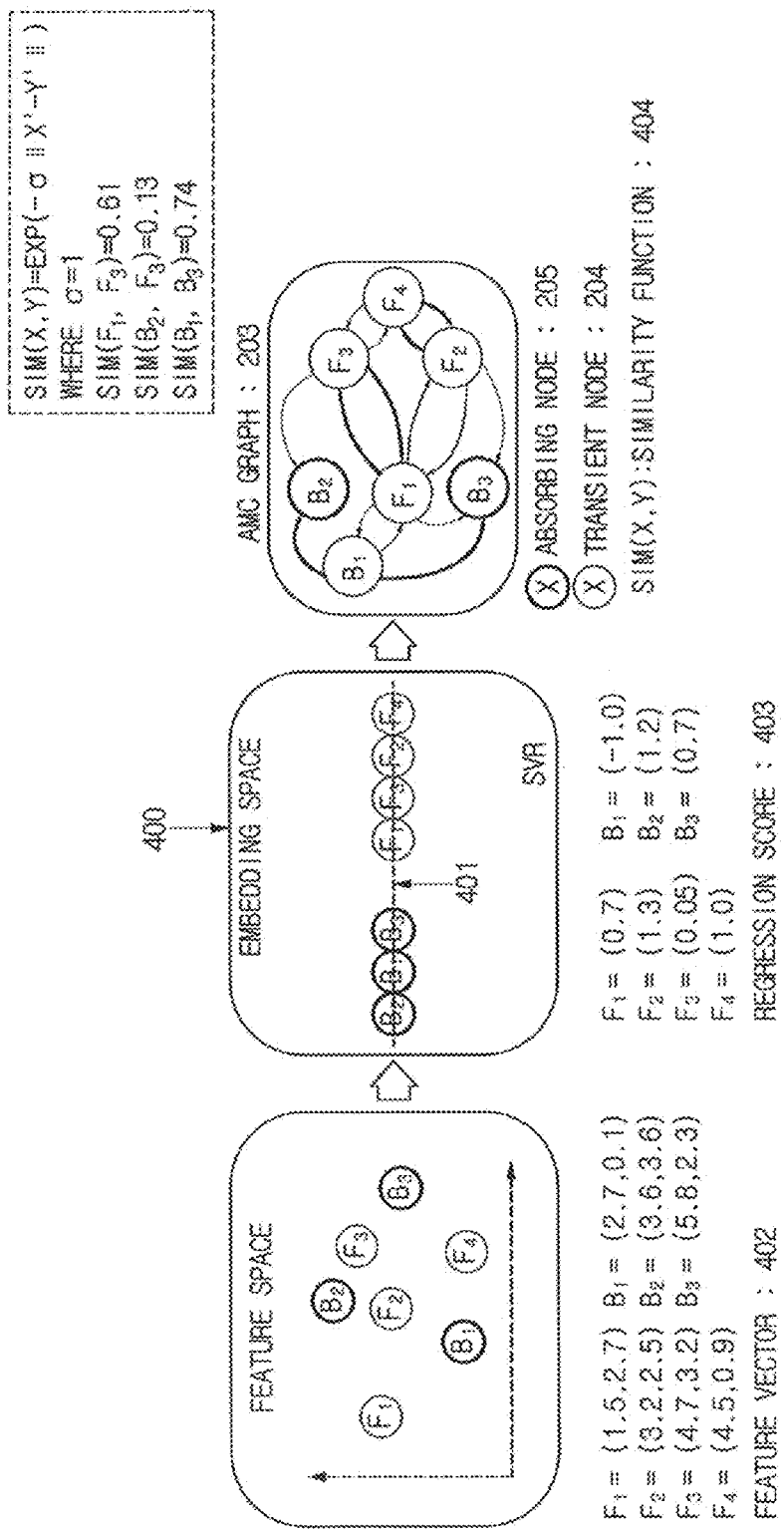
FIG. 4B is a drawing demonstrating the process of constructing the AMC graph with the projected features in the embedding space by using a particular regression model and equations thereof in accordance with one example embodiment of the present invention.

FIG. 4B is a drawing demonstrating the process of constructing the AMC graph with the projected features in the embedding space by using a particular regression model and equations thereof in accordance with one example embodiment of the present invention.

Referring to FIG. 4B, as an example, a calculation process is briefly illustrated using equations and a procedure described below. After projecting the original features of the respective superpixels, the features extracted from the same or similar regions have same labels, e.g., either both of +1 or −1, while the features extracted from the distinct regions have opposite labels, e.g., +1 and −1.

Further, it is noticeable that a numerical value of the degree of similarity 404 of the regression scores 403 associated with two nodes, e.g., two features extracted from the same or similar regions, in the AMC graph 203 is remarkably higher than that of the degree of similarity 404 of the regression scores 403 of another two nodes, e.g., two features extracted from the distinct regions, in the AMC graph 203.

As an example shown in FIG. 4B, the degree of similarity 404 between the regression scores 403 of $F_1$ and $F_3$ is 0.61, i.e., edge weight of the edge connecting nodes $F_1$ and $F_3$ in the AMC graph 203, while the degree of similarity 404 between the regression scores 403 of $B_1$ and $B_3$ is 0.74, and the degree of similarity 404 between the regression scores 403 of $F_3$ and $B_2$ is 0.13. Hence, a higher degree of similarity between the regression scores 403 of two nodes, i.e., a higher edge weight, is depicted thicker in the AMC graph 203, and an edge with the higher edge weight connects the two nodes whose features are extracted from the same or similar regions, for example, either foregrounds or backgrounds. An effectiveness of projecting the original features of the superpixels is demonstrated by numerical values shown in FIG. 4B.

Figure 5A:
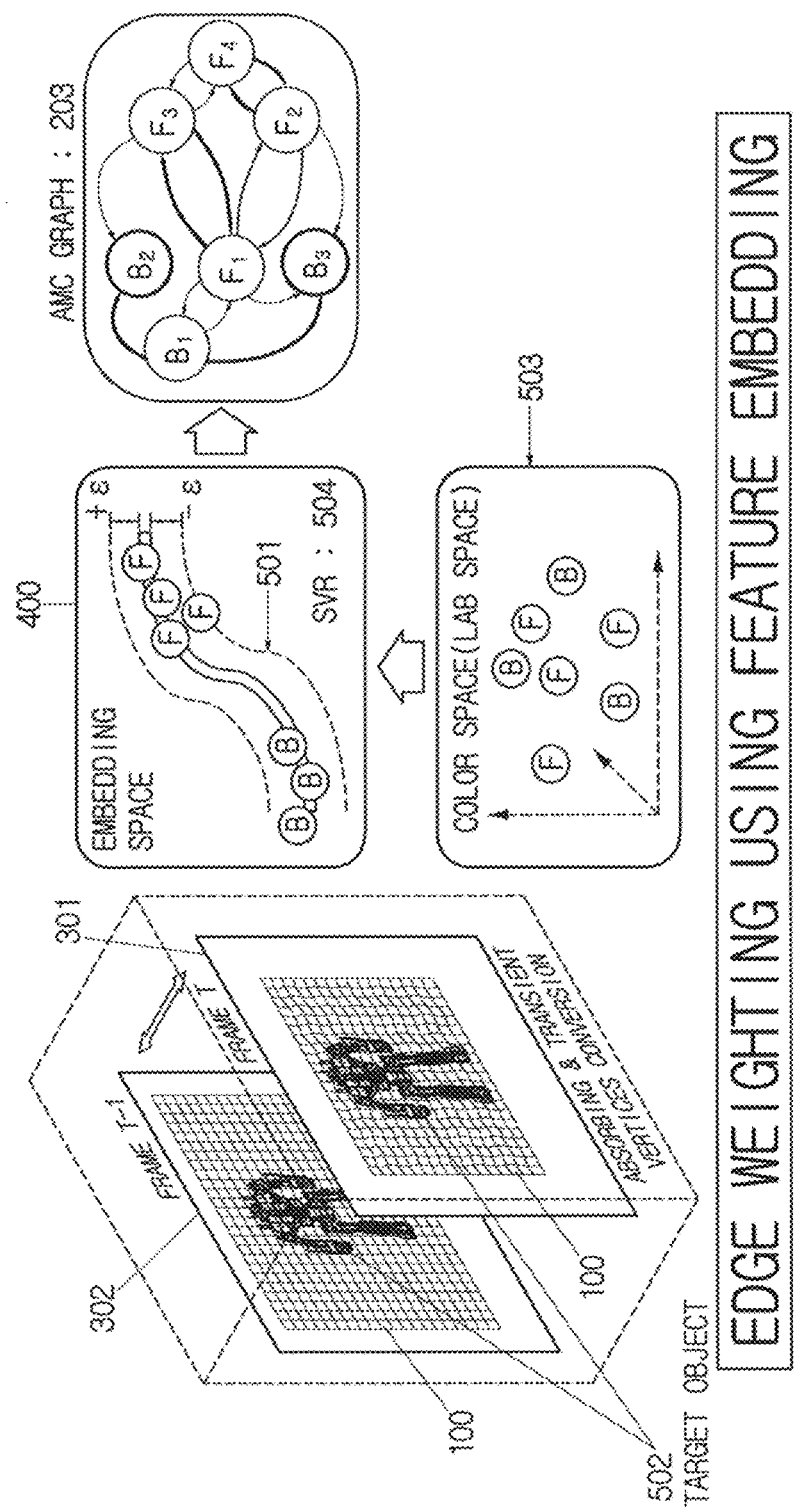
FIG. 5A is a drawing showing a process of constructing an AMC graph with color features and a specific regression model in accordance with one example embodiment of the present invention.

FIG. 5A is a drawing showing a process of constructing an AMC graph with color features and a specific regression model in accordance with one example embodiment of the present invention.

Referring to FIG. 5A, more detailed illustrations are given with respect to the process of constructing the AMC graph 203. The ROI 100 in the frame t 301, i.e., the current frame, is obtained by enlarging a bounding box, e.g., 1.7 times with a fixed center point, surrounding a target object 502, i.e. foregrounds. The bounding box is acquired by applying optical flows to a segmentation result in the frame t−1 302, i.e., the previous frame. In detail, the bounding box including the target object 502 in the current frame is acquired by warping the segmentation result of the target object 502 in the previous frame and then finding a tightest bounding box including the warping result. The warping result is obtained by estimating motions of the target object 502 through pixel-wise optical flow. In other words, the tracking algorithm warps the superpixels within the ROI 100 of the previous frame by finding a pattern of apparent motions of the target object 502. Herein, EPPM is employed to obtain pixel-wise optical flow, but it is not necessarily limited thereto.

After constructing the AMC graph 203 using all the superpixels within the ROIs 100 of the current frame t 301 and the previous frame t−1 302, a segmentation result for the target object 502 within the current frame is acquired by thresholding individual nodes in the AMC graph 203 using absorption times of the respective nodes. The segmentation result for the target object 502 in the current frame may be propagated to subsequent frames in a recursive manner to obtain a series of tracking results.

For a reference, each node has its own absorption time that is the number of steps from itself to any absorbing node 205 in the AMC graph 203 by random walk. And the respective nodes are thresholded based on a threshold value that is determined by averaging the absorption times of all transient nodes 204 within the ROI 100 in the current frame, but it is not limited thereto. Alternatively, a threshold value may be determined by using at least part of the transient nodes 204 within the ROI 100 in the current frame 301.

Meanwhile, the segmentation result for the target object may be significantly improved by projecting the original features of all the superpixels within the ROI 100 in the current frame 301 and in the previous frame 302 onto a hyperplane in the embedding space by performing an operation selected by referring to characteristics of the original features of the superpixels.

For instance, as illustrated in FIG. 5, if mean color in LAB space 503 is selected as a feature for each superpixel and if Support Vector Regressor (SVR) 504 is adopted as a regression model, a degree of similarity of the regression scores associated with end superpixels determines an edge weight for each edge in the AMC graph 203 as mentioned above.

Referring to FIG. 5A again, edges depicted thicker in the AMC graph 203 represent a higher degree of similarity between the regression scores of any two connected nodes in the AMC graph 203. Herein, the regression scores are obtained by training a Support Vector Regressor (SVR) 504 maximizing differences between superpixels with different labels while minimizing differences between superpixels with same labels.

That is, since edge weights of nodes, i.e., vertices, with the same labels should be larger than those of nodes with the different labels, contrastive scores, which maximize differences between foreground and background superpixels while minimizing differences between superpixels within the same regions, e.g., either foregrounds or backgrounds, may be acquired.

Herein, as described above, the labels are respectively denoted as +1 for nodes categorized as foreground and as −1 for nodes categorized as background among the individual nodes in the AMC graph 203. For a reference, the feature for each superpixel may be color, pattern or feature vector obtained by Deep Learning.

Specifically, the objective function of Support Vector Regressor (SVR) 504 is defined as follows:

$$\operatorname*{argmin}_{w,\xi,\hat{\xi}} \frac{1}{2}\|w\|^2 + C\sum_{i=1}^{n}(\xi_i + \hat{\xi}_i) \quad \text{(Equation 1)}$$

$$\text{s.t.} = y_i - \langle w, \Phi(x_i)\rangle - b \le \varepsilon + \xi_i, \xi_i \ge 0,$$

$$\langle w, \Phi(x_i)\rangle + b - y_i \le \varepsilon + \hat{\xi}_i, \hat{\xi}_i \ge 0,$$

where x is a feature and C is a constant, e.g., 10, and $\Phi$: $\mathbb{R}^d \to \mathbb{R}^{d*}$ (d<d*) denotes a non-linear feature mapping function. A radial basis function is employed as a kernel for implicit non-linear feature mapping as follows:

$$\kappa(x_i, x_j) = \langle \Phi(x_i), \Phi(x_j)\rangle = \exp\left(\frac{\|x_i - x_j\|^2}{\gamma^2}\right) \quad \text{(Equation 2)}$$

where γ is a constant, e.g., 1. After training the regressor, a regression score of an arbitrary input feature, e.g., a feature vector, is given by following equation:

$$r_i = f(x_i) = (w, \Phi(x_i)) \quad \text{(Equation 3)}$$

That is to say, each regression score associated with each node in the AMC graph 203 is acquired by the equation described above using a projected feature of each superpixel associated with each node. Then, the edge weight of each of the edges is obtained by calculating the degree of similarity between the regression scores of the end nodes. The equation is as follows:

$$w_{ij} = \exp\left(-\frac{|r_i - r_j|}{\sigma_r}\right) \quad \text{(Equation 4)}$$

where $r_i$ and $r_j$ are the regression scores of two connected nodes and where $\sigma_r$ is a constant, e.g. 0.1.

For a reference, to train the regressor of SVR 504, the superpixels related to the target object 502 in the previous frame and in the first frame, i.e., an initial frame, may be treated as foreground nodes, whereas superpixels except for those related to the target object 502 in the previous frame and in the first frame and superpixels at a boundary of the ROI 100 in the current frame are treated as background nodes. Herein, the superpixels at the boundary of the ROI 100 in the current frame represent unseen backgrounds, and information from the first frame is exploited to avoid drift problem.

FIG. 5B is a drawing illustrating a method of constructing inter-frame edges within the AMC graph in accordance with one example embodiment of the present invention.

Referring to FIG. 5B, two distinct frames are illustrated. The two distinct frames herein are two consecutive frames indicated as the frame t−1 302 and the frame t 301, but it is conspicuous for those skilled in the art that the two distinct frames are not limited thereto.

In FIG. 5B, each square may represent a pixel. Squares with same brightness in each of the frames indicate that they are within the same local region, e.g., superpixel. A shape of the local region, e.g., the superpixel, may be different for each of the frames since the target object 502 or background in each of the frames may be changed in its color or contour.

An inter-frame edge may be created by using pixel-wise optical flow, but it is not necessarily limited thereto. A straight line with an arrow in FIG. 5B may represent optical flow calculated for each pixel within the superpixel 505 having dark grey color in the frame t−1. Any superpixel within the frame t may create the inter-frame edge with the superpixel 505 having dark grey color in the frame t−1 in case the superpixel 506 in the frame t contains any one pixel originally belonging to the superpixel 505. Two curved lines in FIG. 5B may represent respective inter-frame edges created therefore.

In detail, one of the inter-frame edges is created between the superpixel 505 with dark grey color in the frame t−1 and the superpixel 506 with the same dark gray color in the frame t while the other one of the inter-frame edges is created between the superpixel 505 with the same dark gray color in the frame t−1 and a superpixel 507 with white color in the frame t. For a reference, there is no difference for calculating an edge weight for both types of edges, i.e., inter-frame edges and intra-frame edges in the AMC graph.

Figure 6:
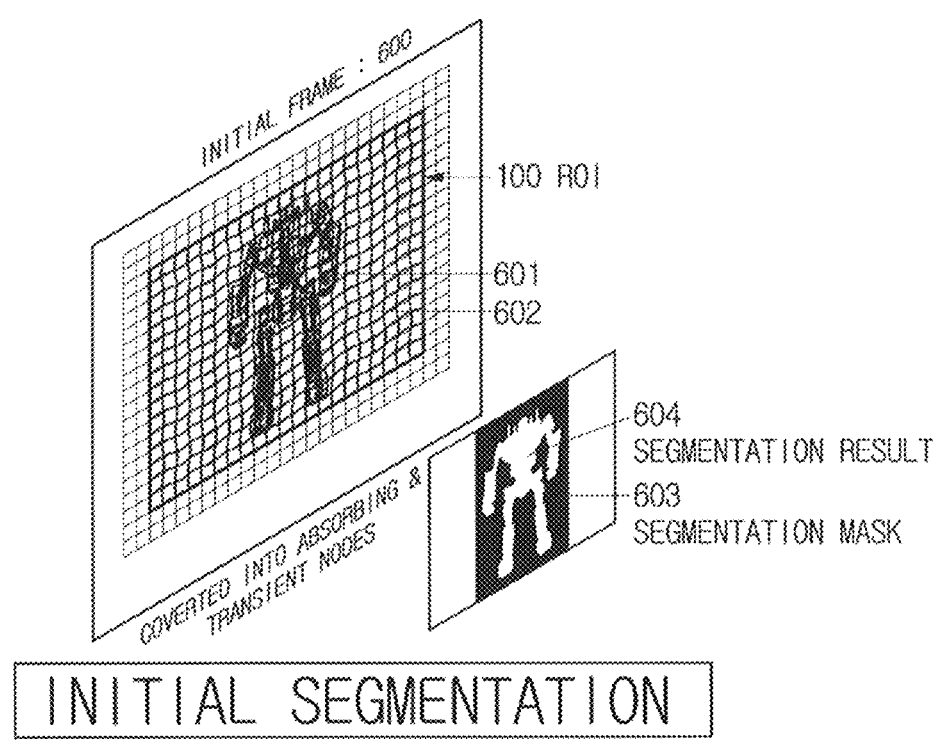
FIG. 6 is a drawing illustrating a process of obtaining an initial segmentation mask in accordance with one example embodiment of the present invention.

FIG. 6 is a drawing illustrating a process of obtaining an initial segmentation mask in accordance with one example embodiment of the present invention.

As shown in FIG. 6, an initial segmentation mask 603 may be obtained by simply computing absorption times of all transient nodes in an initial AMC graph with only intra-frame edges, and thresholding the absorption times of all the transient nodes. Since there are no inter-frame edges in the initial AMC graph which is constructed by using only initial frame that is corresponding to the first frame of the video data. In the initial frame of the video data, a bounding box for the target object may be given by a variety of ways.

In detail, the tracking algorithm denotes superpixels 602 outside the bounding box in the initial frame as absorbing nodes in the initial AMC graph and superpixels 601 related to foreground as transient nodes, and obtains the initial segmentation mask 603 by thresholding the respective absorption times of the respective transient nodes in the initial AMC graph.

Specifically, the transient nodes in the initial AMC graph are given by the superpixels overlapped with an initial ground-truth (GT) bounding box of the target object more than a specific percentage, e.g., 50%, and the absorbing nodes in the initial AMC graph are given by the superpixels which do not correspond to those transient nodes within an extended bounding box, i.e., the region of interest (ROI) 100, for the target object.

Figure 7:
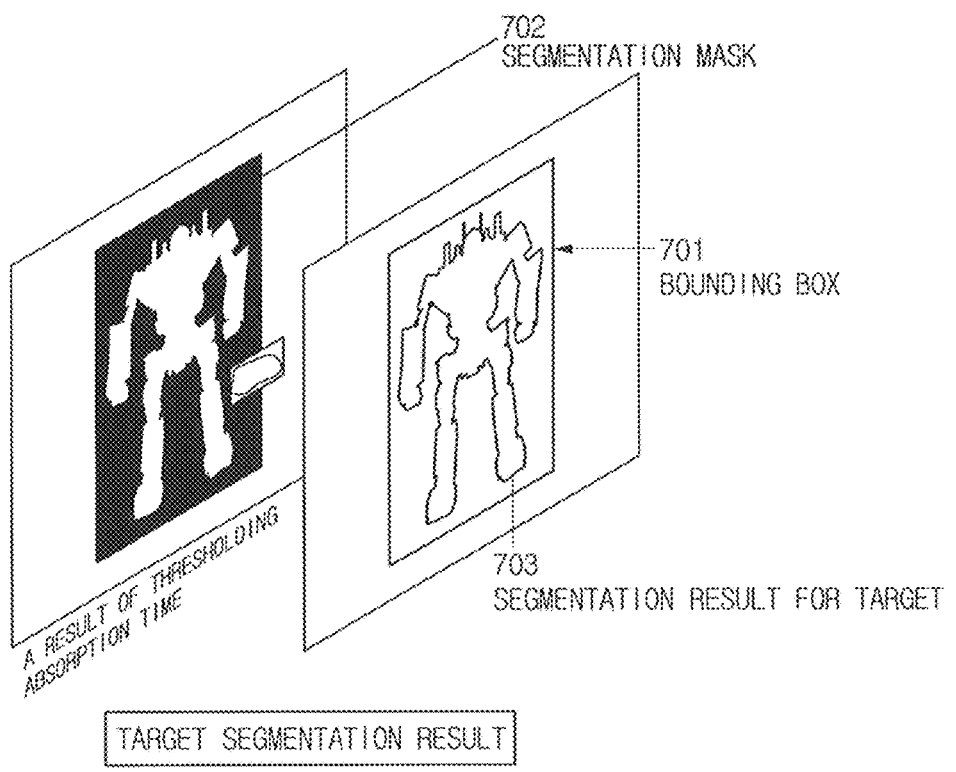
FIG. 7 is a drawing exemplarily showing a tracking result for a target object including a segmentation mask, a segmentation result for the target object, and a bounding box in accordance with the example embodiment of the present invention.

FIG. 7 is a drawing exemplarily showing a tracking result for a target object, where the tracking result includes a segmentation mask, a segmentation result for the target object, and a bounding box in accordance with the example embodiment of the present invention.

Referring to FIG. 7, the tracking result includes the segmentation result for the target object 703, the segmentation mask 702 and the bounding box 701 acquired by thresholding the individual nodes in the AMC graph 203 using absorption times thereof, but the tracking result may not be limited thereto. A random walker traces the AMC graph 203 to obtain the absorption times for the individual nodes in the AMC graph 203 with a reference to transition probabilities. The transition probabilities are described in more details in the following description.

Figure 8A:
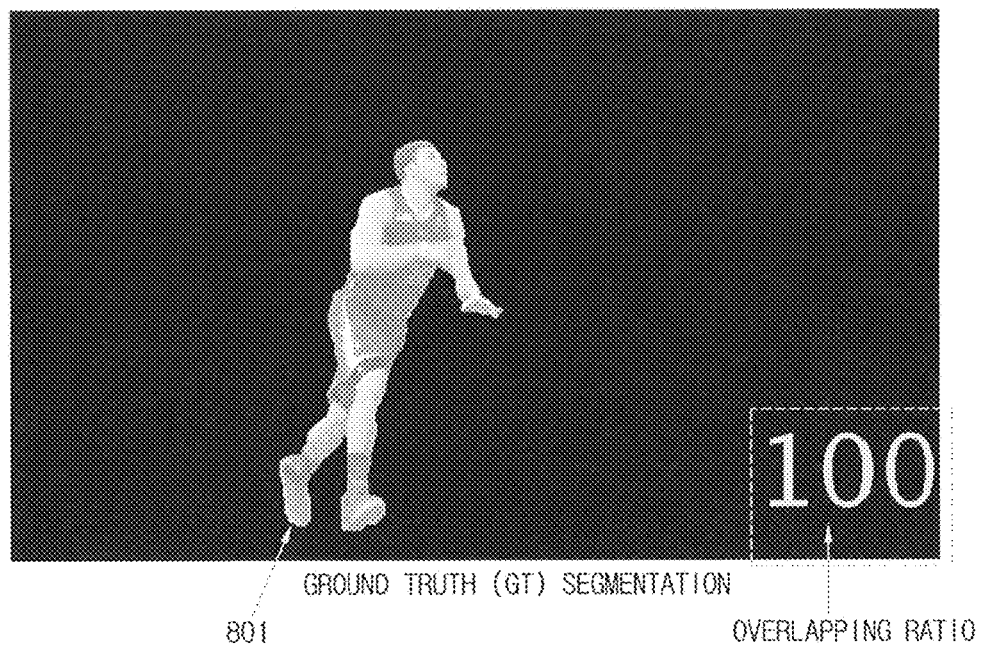
FIG. 8A is a drawing exemplarily showing a Ground-Truth (GT) segmentation result for a target object.

FIG. 8A is a drawing exemplarily showing a Ground-Truth (GT) segmentation result for a target object.

Specifically, "100.0" in the bottom right corner of FIG. 8A denotes that FIG. 8A represents the GT segmentation result per se.

Figure 8B:
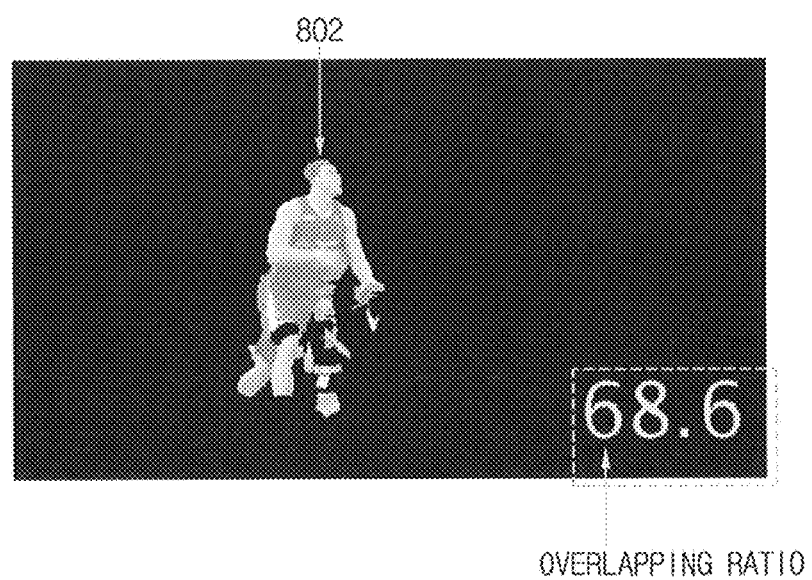
FIG. 8B is a drawing exemplarily showing a segmentation result for the target object obtained by using original features with the tracking algorithm disclosed.
Figure 8C:
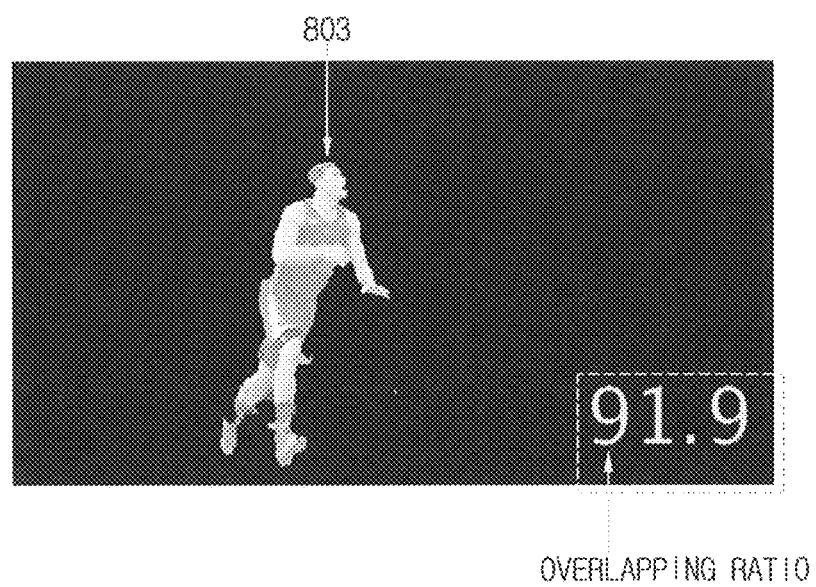
FIG. 8C is a drawing exemplarily showing a segmentation result for the target object obtained by using projected features with the tracking algorithm disclosed.

To compare each overlapping ratio in FIGS. 8B to 8C, the overlapping ratio can be defined as a ratio of an intersection of pixels of both the GT segmentation result 801 for a target object and an estimated segmentation result for the target object, e.g., 802 and 803, to a union of pixels thereof. In this case, the target object to be tracked is a basketball player.

FIG. 8B is a drawing exemplarily showing a segmentation result for the target object obtained by using original features with the tracking algorithm disclosed.

Referring to FIG. 8B, segmenting the target object, i.e., the basketball player, from his background is accomplished by adopting the tracking algorithm devised and disclosed. The tracking algorithm use the segmentation result propagated from the previous frame as described above. Herein, the original features of the respective superpixels are defined as the average RGB values of pixels within a superpixel.

As shown in FIG. 8B, segments of faces and hands of audiences in the background of a frame image are deemed as foregrounds. Thus, the tracking algorithm may generate a fragmented target segmentation mask due to missing foreground superpixels, and the target segmentation mask generated may contain false-positive superpixels.

Since a color value is selected as a feature descriptor, it is a bit challenging for the tracking algorithm to distinguish features of audiences in the background from features of the basketball player, i.e., target object, since the color value of the faces and the hands of the audiences in the background is same as or similar to color values of skins of the target object to be tracked, i.e., the basketball player. Thus, the overlapping ratio for this segmentation result 802 is 68.6.

Accordingly, without projecting the original features of the superpixels, the segmentation result 802 or the target segmentation mask may be noisy due to unexpected feature similarity between foreground superpixels and background superpixels and/or potential feature dissimilarity between foreground superpixels.

FIG. 8C is a drawing exemplarily showing a segmentation result for the target object obtained by using projected features with the tracking algorithm disclosed.

Referring to FIG. 8C, the segmentation result 803 for the target object is acquired by projecting features related to the target object to 1 whereas projecting features related to the background to 0. As it is revealed by the overlapping ratio in FIG. 8C which is 91.9, using the projected features of superpixels is more effective than using the original features thereof with the tracking algorithm devised as the segmentation results in FIGS. 8B and 8C shown.

Figure 8D:
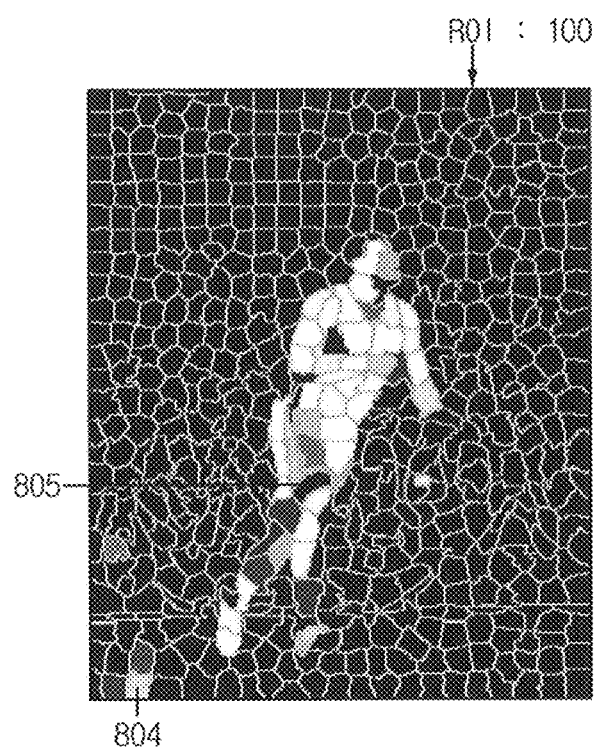
FIG. 8D is a drawing exemplarily illustrating a projection result of the original features of superpixels within the ROI of the frame in accordance with one example embodiment of the present invention.

FIG. 8D is a drawing exemplarily illustrating a projection result of the original features of superpixels within the ROI of the frame in accordance with one example embodiment of the present invention.

As shown in FIG. 8D, a projected feature value of a part of superpixels within the ROI 100 is depicted by white and bright color as its projected feature value is closer to 1 while the projected feature value of another part of superpixels within the ROI 100 is depicted by black and dark color as its projected feature value is closer to 0. A superpixel indicated as 804 in FIG. 8D is a false-positive superpixel while a superpixel denoted as 805 therein is a false-negative superpixel. That is, even with the projection, there still may be miss-classified superpixels, but the segmentation result is substantially improved as the overlapping ratio in the figure shows.

FIG. 9 is a drawing illustrating an impact of different coefficients used by weight adjustments on segmentation results in accordance with one example embodiment of the present invention.

Referring to (A) of FIG. 9, an input frame of a video sequences for a particular target object continuously changing its motion is illustrated, and (B) of FIG. 9 shows a Ground-Truth (GT) segmentation result for the particular target object, i.e., a female gymnast.

The transition probabilities mentioned above may be obtained for all the edges in the AMC graph 203 based on their corresponding edge weights. However, the respective edge weights may be adjusted to increase distinctiveness of the absorption times of foreground and background superpixels.

Each of the adjusted edge weights may be acquired through following equations:

$$q_{ij} = \frac{\pi_t w_{ij}}{\sum_{l=1}^{|V|} \pi_{il} w_{il}} \text{ and } r_{ik} = \frac{\pi_a w_{ik}}{\sum_{l=1}^{|V|} \pi_{il} w_{il}} \quad \text{(Equation 5)}$$

where $v_i$, $v_j \in V^T$, $v_k \in V^A$, and $$\pi_{il} = \begin{cases} \pi_t & \text{if } v_l \in V^T \\ \pi_a & \text{if } v_l \in V^A \end{cases} \quad \text{(Equation 6)}$$

where $V^T$ is the set of transient nodes and $V^A$ is the set of absorbing nodes. Coefficients $\pi_t$ and $\pi_a$ are respectively multiplied to the respective edge weights based on a type of the respective edges. For a reference, two types of the edges are defined: (1) transient edges connecting any two transient nodes and (2) absorbing edges connecting one of the transient nodes to one of the absorbing nodes. All the transient edges are bi-directional while all the absorbing edges are uni-directional.

Specifically, if $q_{ij}$ denotes each transition probability of each transient edge and $r_{ik}$ denotes a transition probability of an absorbing edge, by setting the coefficients $\pi_t < \pi_a$, the tracking algorithm may facilitate fast absorption of the random walk starting from nodes related to the background, and thus may result in more distinctive absorption times.

In (C) of FIG. 9 and (D) of FIG. 9, an impact of parameter settings of the coefficients $\pi_t$ and $\pi_a$ on the segmentation results is revealed. If the transition probabilities are equally weighted for the absorbing and transient edges, i.e., $\pi_t = \pi_a$, background superpixels are often mislabeled as foreground features as shown in (C) of FIG. 9, and thus resulting in a false-positive segmentation result for the particular target object.

However, if the transition probabilities are more heavily weighted for the absorbing edges than those for the transient edges, as illustrated in (D) of FIG. 9, the segmentation result for the particular target object obtained is much closer to the GT segmentation result shown in (B) of FIG. 9. Not only the edge weights but the absorption times as well may be modified with the tracking algorithm.

FIG. 10 is a drawing exemplarily illustrating a comparison of segmentation results on a basis of different absorption times in accordance with one example embodiment of the present invention.

In (A) of FIG. 10, another input frame of a video sequence for a specific target object, i.e., a diver, is shown, who is rapidly changing her motion. And (B) of FIG. 10 shows a Ground-Truth (GT) segmentation result for the specific target object.

The original absorption time computes the time spent on every transient node until the random walker reaches any absorbing node, within which the superpixels corresponding to the unseen backgrounds often have large absorption times, and thus resulting in erroneous segmentation result for the specific target object, as shown in (C) of FIG. 10. However, a modified absorption time calculates the number of times that a transient node is passed by the random walker. Also, the modified absorption time is more effective to handle unseen background regions as illustrated in (D) of FIG. 10. Moreover, the modified absorption time is acquired on a basis of the adjusted edge weight. Furthermore, the tracking algorithm disclosed herein may improve the accuracy of the segmentation result for the specific target object by employing a global appearance model.

FIG. 11 is a drawing exemplarily presenting a comparison result of merging with 1-hop and 2-hop neighborhood systems of superpixel in accordance with one example embodiment of the present invention.

To alleviate the fragmentation problem illustrated in (D) of FIG. 10, the tracking algorithm devised may acquire multiple connected components within a certain number of hops for the transient nodes thresholded in the AMC graph 203, i.e., foreground superpixels.

For instance, the tracking algorithm may group together foreground segments connected within 2-hops in the AMC graph 203 to construct candidate regions for the specific target object. After merging nodes within two hops, the tracking algorithm select one connected component among the multiple connected components, i.e., candidate regions, where the selected one connected component is the most similar connected component to the global appearance model for the specific target object in the input frame.

Herein, the global appearance model may be a holistic appearance model based on normalized color histogram of pixels in the segmentation mask for the foreground, but it is not necessarily limited thereto.

A comparison result of merging nodes corresponding to the specific target object within 1-hop and 2-hops in the AMC graph 203 is respectively shown in (A) and (B) of FIG. 11. Bounding boxes shown may denote the candidate regions for the specific target object, and the bounding box with darker color indicates the segmentation result for the specific target object.

FIG. 12 is a drawing exemplarily illustrating benefits of employing holistic appearance model in accordance with one example embodiment of the present invention.

There are two candidate regions for the target object in both figures, (A) and (B) of FIG. 12. The tracking algorithm disclosed may select a correct candidate region for the target object using the holistic appearance model based on color histogram. Also, the tracking algorithm may choose the segmentation result for the target object in a frame image based on the selected one connected component to thereby acquire a tracking result which might include a corresponding tracking box.

Furthermore, the tracking algorithm disclosed by the present invention and its various embodiments are evaluated by challenging benchmark datasets described below. Results of the evaluation have been summarized and provided in the following Table 1 and Table 2. Five independent datasets used for the evaluation are non-rigid object tracking dataset (NR), generalized background subtraction dataset (GBS), video saliency dataset (VS), SegTrack v2 dataset (ST2) and DAVIS dataset.

The various preferred embodiments of the tracking algorithm disclosed may include AMCT without regression (AMCT–NR), AMCT without global appearance model (AMCT–NA), and AMCT incorporating CNN feature descriptors (AMCT+CNN), within which feature of each superpixel within the ROI in the current frame and in the previous frame is derived through Convolutional Neural Network (CNN). Compared to other preferred embodiments of the tracking algorithm disclosed, AMCT+CNN is slow since SVR training is substantially slow for the high dimensionality of CNN features. For a reference, AMCT denotes AMC Tracking.

TABLE 1

Average overlap ratio of segmentation masks for tracking-by-segmentation algorithms

|  | AMCT | AMCT–NA | AMCT–NR | AMCT+CNN | OGBDT | SPT |
|---|---|---|---|---|---|---|
| NR | 58.6 | 49.3 | 23.1 | 66.3 | 53.3 | 29.7 |
| GBS | 74.8 | 70.4 | 53.0 | 77.1 | 59.7 | 45.9 |
| VS | 84.1 | 83.8 | 71.4 | 82.3 | 79.8 | 61.0 |
| ST2 | 58.8 | 60.7 | 47.2 | 71.3 | 47.6 | 26.3 |
| DAVIS | 59.2 | 56.9 | 41.2 | 65.1 | 44.9 | 27.1 |

TABLE 2

Average overlap ratio of bounding boxes for tracking-by-segmentation algorithms

|  | AMCT | AMCT–NA | AMCT–NR | AMCT+CNN | OGBDT | SPT |
|---|---|---|---|---|---|---|
| NR | 66.9 | 50.8 | 25.7 | 73.3 | 60.8 | 35.7 |
| GBS | 80.0 | 71.4 | 53.7 | 81.9 | 61.2 | 55.2 |
| VS | 88.2 | 88.1 | 75.4 | 88.7 | 78.8 | 61.5 |
| ST2 | 64.8 | 64.3 | 50.3 | 76.3 | 50.2 | 53.5 |
| DAVIS | 60.9 | 60.1 | 44.5 | 67.8 | 50.0 | 43.2 |

The overall performance of all algorithms compared with the five datasets are summarized in Table 1 and 2. Variations of the tracking algorithm disclosed may demonstrate outstanding performance in both segmentation mask and bounding box overlapping ratios compared to other tracking methods such as SPT and OGBDT which are current state-of-the-art algorithms in tracking by segmentation field. Particularly, AMCT and AMCT+CNN outperform the stateof-the-art tracking algorithms for bounding box prediction in all tested datasets by large margins. This is mainly because bounding box tracking is not effective to follow highly articulated or deformable target objects.

Herein, any digital computing device with at least one processor (not illustrated) to perform operations or computations delineated above may be adopted as an appropriate device for executing the tracking algorithm of the present invention. A communication part (not illustrated) of the device may be configured to acquire images of the frames, i.e., the video data.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled artisan in a pertinent field. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language codes made by a complier but also a high level codes that can be used by an interpreter etc., which is executed by a computing device. The aforementioned hardware device can work as more than a software module to perform the technical features of the present invention and they can do the same in the opposite case.

As seen above, the present invention has been specifically described by such matters as detailed components, limited embodiments, and drawings. While the invention has been shown and described with respect to the preferred embodiments, it, however, may be appreciated by those skilled in the art that various changes and modifications may be made without departing from the spirit and the scope of the present invention as defined in the following claims.

Accordingly, the thought of the present invention must not be confined to the explained preferred or example embodiments, and the following patent claims as well as everything including variations equal or equivalent to the patent claims pertain to the category of the thought of the present invention.

What is claimed is:

1. A method of tracking a target object in frames of video data using Absorbing Markov Chain (AMC), comprising steps of: (a) a computing device acquiring a bounding box containing the target object in a current frame and a segmentation result for the target object in a previous frame; (b) the computing device obtaining a region of interest (ROI) in the current frame by enlarging the bounding box to contain a portion of information on background surrounding the target object; (c) the computing device acquiring information on local regions within the ROI in the current frame; (d) the computing device constructing an AMC graph using at least part of the local regions within the region of interest (ROI) in the current frame and local regions within a region of interest (ROI) in the previous frame; and (e) the computing device acquiring a segmentation result for the target object within the current frame by thresholding individual nodes in the AMC graph using absorption times thereof, wherein the AMC graph includes two subsets of nodes which have (i) a set of absorbing nodes corresponding to local regions containing information on background within the ROI in the previous frame and (ii) a set of transient nodes corresponding to the local regions within the ROI in the current frame and local regions relating to the segmentation result for the target object within the ROI in the previous frame, and wherein the AMC graph includes two subsets of edges which are a set of intra-frame edges and a set of inter-frame edges, and wherein the individual nodes have their own absorption times that are the number of steps from themselves to any absorbing node.

2. The method of claim 1, before the step of (d), further comprising a step of: the computing device projecting or supporting another device to project an original feature of each of the local regions within the ROI in the current frame and that of each of the local regions within the ROI in the previous frame onto an embedded space by performing a certain operation determined by referring to characteristics of the original feature.

3. The method of claim 2, wherein the computing device projecting or supporting another device to project the original feature of each of the local regions within the ROI in the current frame and that of each of the local regions within the ROI in the previous frame by using regression with at least one regressor.

4. The method of claim 3, wherein the step of (d) includes steps of:
(d-1) the computing device acquiring or supporting another device to acquire each regression score associated with each node in the AMC graph and acquired by using each projected feature of the local regions within the ROI in the current frame and the ROI in the previous frame via the at least one regressor;
(d-2) the computing device calculating or supporting another device to calculate each degree of similarity between the respective regression scores associated with each of two nodes selected among the individual nodes in the AMC graph and connected with each other to thereby obtain each corresponding weight for the respective edges in the AMC graph;
(d-3) the computing device calculating or supporting another device to calculate each transition probability for each of the edges based on its corresponding weight; and
(d-4) the computing device tracing or supporting another device to trace the AMC graph by random walk to obtain the respective absorption times for the individual nodes in the AMC graph by referring to their corresponding transition probabilities calculated at the step of (d-3).

5. The method of claim 4, wherein the individual nodes in the AMC graph have their own modified absorption times that are acquired based on adjusted edge weights, where the adjusted edge weights are obtained by repeatedly multiplying (i) one of different coefficients selected based on an edge type and (ii) the corresponding weight of each of the edges in the AMC graph and where the respective modified absorption times of the respective transient nodes corresponding to the segmentation result for the target object in the previous frame represent the number of times a random walker passing through the respective transient nodes.

6. The method of claim 4, wherein the regression scores are acquired by adopting Support Vector Regression (SVR), where labels are respectively denoted as +1 for nodes determined to be foreground and as −1 for nodes determined to be background among the individual nodes in the AMC graph.

7. The method of claim 6, wherein the at least one regressor is trained by a set of nodes representing foreground and a set of nodes representing background, where each node in the set of nodes representing foreground corresponds to one of the local regions within the segmentation result for the target object in the previous frame and the target object in a first frame of the video data, and each node in the set of nodes representing background corresponds to one of local regions that are not related to the segmentation result for the target object in the previous frame and in the first frame.

8. The method of claim 7, wherein the set of nodes representing background further contains nodes corresponding to local regions at a boundary of the ROI in the current frame and that in the previous frame.

9. The method of claim 1, after the step of (e), further comprising steps of:
 (f) the computing device acquiring or supporting another device to acquire multiple connected components of the transient nodes within a certain number of hops in the AMC graph;
 (g) the computing device selecting or supporting another device to select one connected component among the multiple connected components, wherein the selected one connected component is the most similar connected component to a global appearance model for the target object in the current frame; and
 (h) the computing device adjusting or support another device to adjust the segmentation result for the target object in the current frame by using the selected one connected component, to thereby acquire an adjusted tracking result and its corresponding tracking box.

10. The method of claim 9, before the step of (d), further comprising a step of: the computing device projecting or supporting another device to project each original feature of each of the local regions within the ROI in the current frame and the local regions within the ROI in the previous frame onto an embedded space by performing an operation selected by referring to characteristics of the original feature.

11. The method of claim 10, wherein the original feature of each of the local regions within the ROI in the current frame and the local regions within the ROI in the previous frame is obtained through Convolutional Neural Network (CNN).

12. The method of claim 1, wherein the computing device, at the step of (e), further acquiring or supporting another device to further acquire a segmentation mask after thresholding the individual nodes in the AMC graph using the absorption times thereof.

13. The method of claim 1, wherein the bounding box containing the target object in the current frame is acquired by warping the segmentation result for the target object in the previous frame, and then finding a tightest bounding box containing a warping result.

14. The method of claim 1, wherein, at the step of (e), the individual nodes are thresholded based on a threshold value that is determined by using the absorption times of at least part of the transient nodes within the ROI in the current frame.

15. The method of claim 1, wherein the local regions within the ROI in the current frame and the local regions within the ROI in the previous frame are obtained by clustering pixels into a superpixel using a superpixel segmentation algorithm.

16. The method of claim 1, wherein the computing device acquiring or supporting another device to acquire an initial segmentation mask if the current frame is a first frame of the video data.

17. The method of claim 16, wherein the initial segmentation mask is obtained by thresholding absorption times of individual nodes in an initial AMC graph, which is used to acquire the AMC graph in the step of (d), with only intra-frame edges, where transient nodes of the initial AMC graph are determined by local regions overlapped with initial ground-truth (GT) bounding box of the target object in the first frame more than a specific percentage and absorbing nodes of the initial AMC graph are determined by local regions within the ROI in the first frame which are not determined as the transient nodes of the initial AMC graph.

18. The method of claim 1 further comprises a step of:
 (i) the computing device propagating or support another device to propagate the segmentation result for the target object in the current frame to subsequent frames in a recursive manner to obtain a series of tracking results.

19. A method of segmenting a target object in an image using Absorbing Markov Chain (AMC), comprising steps of: (a) a computing device acquiring a bounding box containing the target object in the image; (b) the computing device obtaining a region of interest (ROI) in the image by enlarging the bounding box to contain a portion of information on background surrounding the target object; (c) the computing device acquiring information on local regions within the ROT in the image; (d) the computing device constructing an AMC graph using at least part of the local regions within the ROI in the image; and (e) the computing device acquiring a segmentation result for the target object within the image by thresholding individual nodes in the AMC graph using absorption times thereof, wherein the AMC graph includes two subsets of nodes which have (i) a set of transient nodes corresponding to local regions overlapped with the bounding box more than a specific percentage in the image and (ii) a set of absorbing nodes corresponding to a part of local regions within the ROI in the image which are not determined as the transient nodes, and wherein each of (i) the transient nodes and (ii) the absorbing nodes in the AMC graph has its own absorption time that is the number of steps from itself to any absorbing node.

20. The method of claim 19, before the step of (d), further comprising a step of: the computing device projecting or supporting another device to project an original feature of each of the local regions within the ROI in the image onto an embedded space by performing a certain operation determined by referring to characteristics of the original feature.

21. The method of claim 20, wherein the computing device projecting or supporting another device to project the original feature of each of the local regions within the ROI in the image by using regression with at least one regressor.

22. The method of claim 19, after the step of (e), further comprising steps of:
 (f) the computing device acquiring or supporting another device to acquire multiple connected components of the transient nodes within a certain number of hops in the AMC graph;
 (g) the computing device selecting or supporting another device to select one connected component among the multiple connected components, wherein the selected one connected component is the most similar connected component to a global appearance model for the target object in the image; and
 (h) the computing device adjusting or support another device to adjust the segmentation result for the target object in the image by using the selected one connected component, to thereby acquire an adjusted segmentation result and its corresponding bounding box.

23. A computing device of tracking a target object in frames of video data using Absorbing Markov Chain (AMC), comprising: a communication part for acquiring the video data; and a processor for performing (i) a process of acquiring a bounding box containing the target object in a current frame within the video data and a segmentation result for the target object in a previous frame within the video data; (ii) a process of obtaining a region of interest (ROI) in the current frame by enlarging the bounding box to contain a portion of information on background surrounding the target object; (iii) a process of acquiring information on local regions within the ROI in the current frame; (iv) a process of constructing an AMC graph using at least part of the local regions within the region of interest (ROI) in the current frame and local regions within a region of interest (ROI) in the previous frame; and (v) a process of acquiring a segmentation result for the target object within the current frame by thresholding individual nodes in the AMC graph using absorption times thereof, wherein the AMC graph includes two subsets of nodes which have (i) a set of absorbing nodes corresponding to local regions containing information on background within the ROI in the previous frame and (ii) a set of transient nodes corresponding to local regions relating to the segmentation result for the target object within the ROI in the previous frame and the local regions within the ROI in the current frame, and wherein the AMC graph includes two subsets of edges which are a set of intra-frame edges and a set of inter-frame edges, and wherein the individual nodes have their own absorption times that are the number of steps from themselves to any absorbing node.

24. The computing device of claim 23, wherein, before the process of (iv), the processor is configured to project or support another device to project an original feature of each of the local regions within the ROI in the current frame and that of each of the local regions within the ROI in the previous frame onto an embedded space by performing a certain operation determined by referring to characteristics of the original feature.

25. The computing device of claim 24, wherein the processor is configured to project or support another device to project the original feature of each of the local regions within the ROI in the current frame and that of each of the local regions within the ROI in the previous frame by using regression with at least one regressor.

26. The computing device of claim 25, wherein the processor, at the process of (iv), is further configured to perform:
(iv-1) a process of acquiring or supporting another device to acquire each regression score associated with each node in the AMC graph and acquired by using each projected feature of the local regions within the ROI in the current frame and the ROI in the previous frame via the at least one regressor;
(iv-2) a process of calculating or supporting another device to calculate each degree of similarity between the respective regression scores associated with each of two nodes selected among the individual nodes in the AMC graph and connected with each other to thereby obtain each corresponding weight for the respective edges in the AMC graph;
(iv-3) a process of calculating or supporting another device to calculate each transition probability for each of the edges based on its corresponding weight; and
(iv-4) a process of tracing or supporting another device to trace the AMC graph by random walk to obtain the respective absorption times for the individual nodes in the AMC graph by referring to their corresponding transition probabilities calculated at the process of (iv-3).

27. The computing device of claim 23, wherein the processor, after the process of (v), is further configured to perform:
(vi) a process of acquiring or supporting another device to acquire multiple connected components of the transient nodes within a certain number of hops in the AMC graph;
(vii) a process of selecting or supporting another device to select one connected component among the multiple connected components, wherein the selected one connected component is the most similar connected component to a global appearance model for the target object in the current frame; and
(viii) a process of adjusting or support another device to adjust the segmentation result for the target object in the current frame by using the selected one connected component, to thereby acquire an adjusted tracking result and its corresponding tracking box.

28. A computing device of segmenting a target object in an image using Absorbing Markov Chain (AMC), comprising: a communication part for acquiring the image; and a processor for performing (i) a process of acquiring a bounding box containing the target object in the image; (ii) a process of obtaining a region of interest (ROI) in the image by enlarging the bounding box to contain a portion of information on background surrounding the target object; (iii) a process of acquiring information on local regions within the ROI in the image; (iv) a process of constructing an AMC graph using at least part of the local regions within the ROI in the image; and (v) a process of acquiring a segmentation result for the target object within the image by thresholding individual nodes in the AMC graph using absorption times thereof, wherein the AMC graph includes two subsets of nodes which have (i) a set of transient nodes corresponding to local regions overlapped with the bounding box more than a specific percentage in the image and (ii) a set of absorbing nodes corresponding to a part of local regions within the ROI in the image which are not determined as the transient nodes, and wherein each of (i) the transient nodes and (ii) the absorbing nodes in the AMC graph has its own absorption time that is the number of steps from itself to any absorbing node.

29. The computing device of claim 28, before the process of (iv), the processor is further configured to project or support another device to project an original feature of each of the local regions within the ROI in the image onto an embedded space by performing a certain operation determined by referring to characteristics of the original feature.

30. The computing device of claim 29, wherein the processor, after the process of (v), is further configured to perform (vi) a process of acquiring or supporting another device to acquire multiple connected components of the transient nodes within a certain number of hops in the AMC graph; (vii) a process of selecting or supporting another device to select one connected component among the multiple connected components, wherein the selected one connected component is the most similar connected component to a global appearance model for the target object in the image; and (viii) a process of adjusting or support another device to adjust the segmentation result for the target object in the image by using the selected one connected component, to thereby acquire an adjusted segmentation result and its corresponding bounding box.

* * * * *